(12) United States Patent
Seagraves et al.

(10) Patent No.: US 11,615,710 B2
(45) Date of Patent: Mar. 28, 2023

(54) PROVIDING INDICATORS OF AVAILABILITY IN A SHARED VEHICLE ENVIRONMENT

(71) Applicant: Ford Motor Company, Dearborn, MI (US)

(72) Inventors: Jamel Seagraves, Campbell, CA (US); Chih-Wei Tang, Mountain View, CA (US); Sudipto Aich, Palo Alto, CA (US); Beaudry Kock, San Francisco, CA (US)

(73) Assignee: Ford Motor Company, Dearborn, MI (US)

( * ) Notice: Subject to any disclaimer, the term of this patent is extended or adjusted under 35 U.S.C. 154(b) by 149 days.

(21) Appl. No.: 16/979,556

(22) PCT Filed: Mar. 16, 2018

(86) PCT No.: PCT/US2018/022951
§ 371 (c)(1),
(2) Date: Sep. 10, 2020

(87) PCT Pub. No.: WO2019/177628
PCT Pub. Date: Sep. 19, 2019

(65) Prior Publication Data
US 2021/0005089 A1     Jan. 7, 2021

(51) Int. Cl.
*G08G 1/00*     (2006.01)
*H04W 4/029*   (2018.01)
*G06Q 50/30*   (2012.01)
*G06Q 10/02*   (2012.01)

(52) U.S. Cl.
CPC ............. *G08G 1/205* (2013.01); *G06Q 10/02* (2013.01); *G06Q 50/30* (2013.01); *H04W 4/029* (2018.02)

(58) Field of Classification Search
CPC ....... G08G 1/205; H04W 4/029; G06Q 10/02; G06Q 50/30
USPC .......................................... 705/13
See application file for complete search history.

(56) References Cited

U.S. PATENT DOCUMENTS

| | | | |
|---|---|---|---|
| 11,214,322 B2* | 1/2022 | Askin | B60L 50/20 |
| 2005/0090951 A1* | 4/2005 | Good | G08G 1/20 |
| | | | 701/31.4 |
| 2011/0010300 A1* | 1/2011 | Audet | G06Q 30/06 |
| | | | 705/307 |

(Continued)

OTHER PUBLICATIONS

"Reaching Available Public Parking Spaces in Urban Environments using Ad-hoc Networking" Published by IEEE (Year: 2011).*

(Continued)

*Primary Examiner* — Zeina Elchanti
(74) *Attorney, Agent, or Firm* — Brandon Hicks; Eversheds Sutherland (US) LLP

(57) ABSTRACT

An intelligent bicycle sharing system, or other vehicle sharing system, is able to provide helpful bicycle availability indications based on historical data and user proximity. Historical data can be collected over time as users use the bicycle sharing system. For example, the historical data may include how many bicycles are checked at out a given time and how many remain at a given location. In some embodiments, an indication may be provided to the user as the user approaches the vehicle sharing system. The indication may provide information regarding the availability of bicycles.

14 Claims, 10 Drawing Sheets

(56) References Cited

U.S. PATENT DOCUMENTS

| | | | |
|---|---|---|---|
| 2013/0238167 A1* | 9/2013 | Stanfield | E05B 81/56 |
| | | | 701/2 |
| 2014/0122190 A1 | 5/2014 | Wolfson et al. | |
| 2014/0210964 A1* | 7/2014 | Muijs | H04N 13/373 |
| | | | 348/54 |
| 2016/0111006 A1* | 4/2016 | Srivastava | G08G 5/0043 |
| | | | 701/3 |
| 2019/0263288 A1* | 8/2019 | Nasu | G01R 31/382 |

OTHER PUBLICATIONS

International Search Report of the International Searching Authority for PCT/US2018/022951 dated Jun. 7, 2018.

* cited by examiner

PROVIDING INDICATORS OF AVAILABILITY IN A SHARED VEHICLE ENVIRONMENT

BACKGROUND

As cities become more complex and populations continue to grow and become more mobile, demand on transportation and related infrastructure is increased. And as lifestyles become increasingly dynamic, people and places are becoming more connected than ever before. People often need to travel within, and between, cities for various reasons such as for work, socializing, and recreation, among others. The frequency and scheduling of travel may vary greatly as well, be it a daily commute, a scheduled event, or a spontaneous trip. Regardless of the distance, destination, or time of travel, people expect to have the freedom to move about and be at the desired location at the desired time. Thus, transportation and mobility systems are fundamental in making such a lifestyle possible. In urban and suburban areas alike, transportation mode sharing programs, such as bicycle ("bike") sharing programs, have become commonplace. Such programs, in essence, provide a service whereby bicycles are made available for shared use to individuals on a short-term basis, such as for rent or borrow. However, conventional bike sharing systems have various shortcomings that lead to a suboptimal user experience and suboptimal utilization efficiency. For example, users may have difficulty ascertaining which bicycles, if any, are available from a bike sharing system. Furthermore, the process to select and check out the bicycle may be frustrating, thereby reducing the likelihood the user chooses the bike sharing system over other means of transportation.

BRIEF DESCRIPTION OF THE DRAWINGS

Various embodiments in accordance with the present disclosure will be described with reference to the drawings, in which.

DETAILED DESCRIPTION

Figure 1:
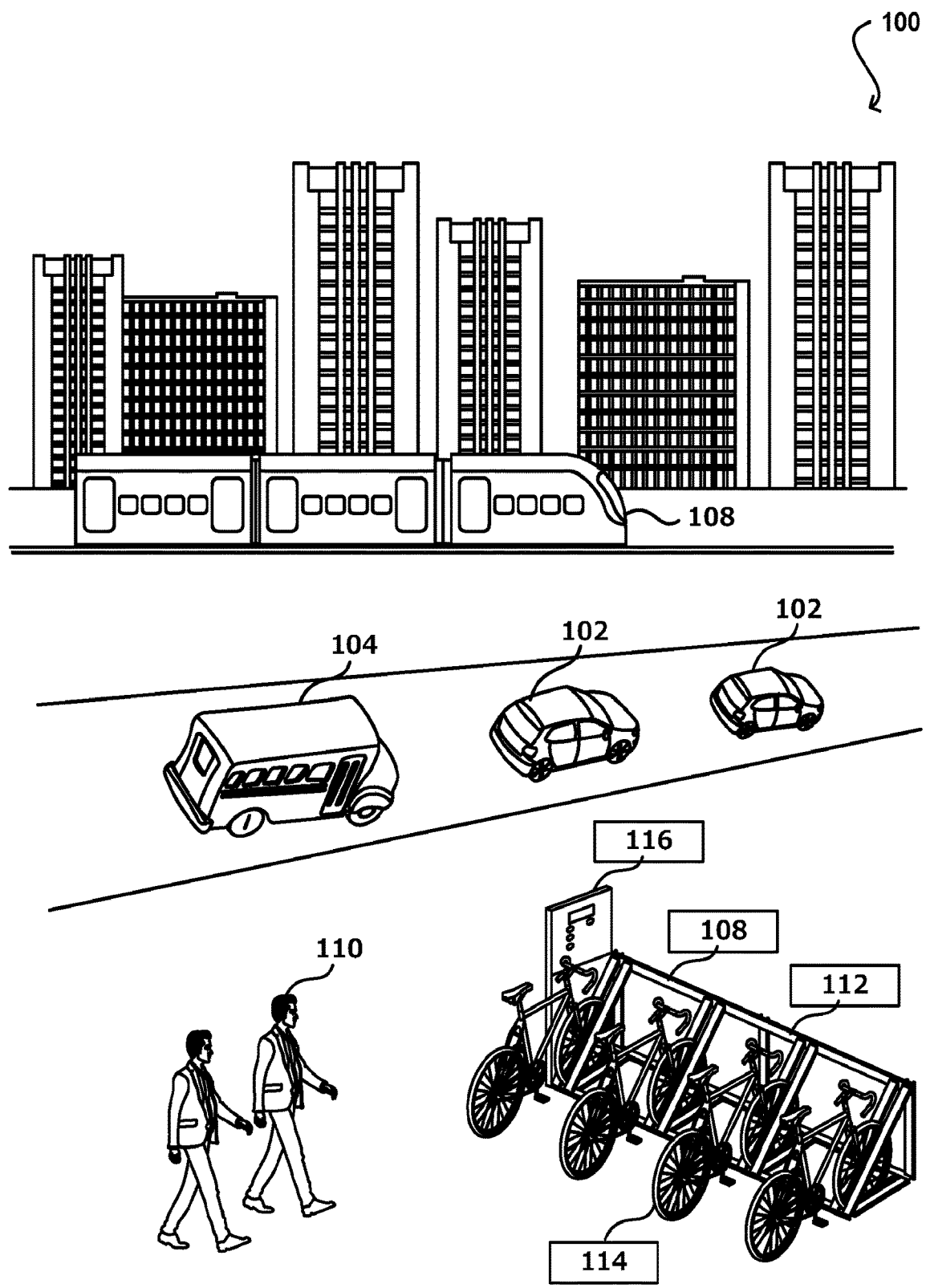
FIG. 1 illustrates an example transportation landscape in which the present systems and methods may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for vehicle sharing. In particular, various embodiments provide for identification and notification of vehicles that a user may utilize, such as bicycles that may be checked out in certain embodiments.

A indicator system, which may be used with a bicycle sharing system, is able to provide information to users regarding the availability of a bicycle associated with the bicycle sharing system. For example, the indicator system may provide a notification to the user to indicate which bicycle is available for check out, which bicycle is undergoing maintenance, which bicycle is already reserved, and the like. In various embodiments, the indicator system may be incorporated within the bicycle, which may be referred to as a smart bicycle, or into the bicycle sharing system. This system may detect the user as the user approaches via one or more near field communication (NFC) protocols and provide an indication to the user regarding the availability of the bicycle. Furthermore, in various embodiments, the system may include a camera or the like to enable object recognition to identify users or potential users moving toward the bicycles of the bicycle sharing system. For example, the indicator system may alert the users that no bicycles are available, thereby reducing the frustration the user may feel from walking to the bicycle sharing station to discover no bicycles are available. Additionally, if there are groups of users or potential users, the indicator system may provide an alert to inform the group that a sufficient number of bicycles is available for each person in the group.

In some embodiments, a control system may be integrated into the indicator system and/or the bicycle sharing system to monitor one or more properties associated with the bicycles. For example, the control system may keep a running count of the number of bicycles available. Furthermore, the control system may monitor reservations, thereby preventing reserved bicycles from being checked out before the user that reserved the bicycles arrives. Additionally, in various embodiments, the control system may monitor ongoing or anticipated maintenance operations for the bicycles, such as monitoring tire pressure, tread wear, and the like. Accordingly, the control system may count bicycles preparing for maintenance as unavailable, and provide an associated indication to the user, thereby providing information to the user as to why a seemingly available bicycle may not be checked out, reducing the frustration felt by the user.

In various embodiments, the indicator system provides a visual, auditory, haptic, or other notification to the user related to the available of a bicycle of the bicycle sharing system. For example, bicycles may be stored within a bike rack or mount and have a light associated with the bicycle in a particular rack. Available bicycles may have a light illuminated a certain color, such as green, while unavailable bikes may have a light illuminated a certain different color, such as red. Furthermore, the indicatory may be associated with an auditory signal, such as an instruction to select a certain bicycle. For example, upon receiving a notification to check out a bicycle, the auditory signal may recite "Go to bike 5" or "Select any available bike." As such, the indicator will provide instructions to the user and also notify the user as to which bicycles are available. Furthermore, the haptic notification may be associated with a user device that the user has. The user device may vibrate to provide an indication that a bicycle is available. Moreover, in various embodiments, more than one notification may be provided. For example, the user device may vibrate and include a color-coded message for the user.

In various embodiments, the bicycle sharing system may detect or otherwise recognize a user as the user approaches the bicycle sharing system. For example, the user may have a user device that includes a program (e.g., an application, an app) that enables the user to check out or otherwise interact with the bicycle sharing system. In various embodiments, the user device interacts with a kiosk of the bicycle sharing system. Further, in embodiments, the user device interacts directly with the bicycle. The user device may include near field communication (NFC) protocols that may be detected by the bicycle sharing system and/or the bicycle when the user is within a range. Upon detection of the user, the bicycle sharing system and/or the bicycle may provide an indication to the user indicative of the availability of one or more bicycles. For example, a light may be illuminated or flash to indicate availability. Further, the user device may receive a message or vibrate to alert the user regarding availability of the bicycle. Additionally, in various embodiments, the application on the user device may be utilized to select and check out a bicycle, thereby improving the user experience by reducing the duration of time for the user to obtain the bicycle.

Although examples illustrated in the present disclosure describe a bicycle sharing system, that systems and methods provided here are applicable to any type of vehicle or mobility resources, such as cars, airplanes, boats, carts, scooters, motorized bikes or scooters, skates, hoverboards, among many others.

Various other features and application can be implemented based on, and thus practice, the above described technology and presently disclosed techniques. Accordingly, approaches in accordance with various embodiments improve the technology of bicycle sharing systems. Traditional bicycle sharing technology includes mechanisms for checking out (e.g., unlocking) bicycles from docking stations based user authentication or payment authentication.

The present disclosure provides an intelligent networked bicycle sharing system that is instrumented with specialized sensors, network interfacing devices, and other electronics that enable users to receive up to date information and even future predictions that can enable them to better utilize the bicycles. Various other applications, processes, and uses are presented below with respect to the various embodiments, each of which improves the operation and performance of the computing device(s) on which they are implemented.

FIG. 1 illustrates an example transportation landscape 100 in which the present systems and methods may be implemented, in accordance with various embodiments. As illustrated in FIG. 1, many types of modes of transportation and mobility may be available in various cities, often depending on certain characteristics of the city, such as population size, population distribution, terrain, among others. Examples of modes of transportation and mobility may include personally owned vehicles 102, public transportation systems such as buses 104 and trains 106, bike sharing 108, and walking 110. Cities may often have a primary mode of transportation or a combination of several modes.

For example, individual car ownership is common in sprawling cities where the population is relatively less dense. Such cities tend to have a less developed public transportation system (e.g., buses, commuter trains) due to the low utilization efficiencies. For example, the cost of developing, maintaining, and operating such systems may outweigh the benefit they provide to the community. In such cities, since locations of interest may be further apart, walking and biking may be less common as well. Thus, the population in cities are heavily reliant on individual cars. However, there may be certain times or locations that are prone to road congestion due to the number of cars on the road or in the area, such as during typical work commuting hours also known as "rush hour" and when there are special events that cause large groups of people to congregate in a small area, such as for a concert or sporting event. Additionally, individual cars are rarely used at full capacity, especially when used for work commutes, resulting in efficiency losses in terms of both space and energy.

Conversely, densely populated cities tend to have a more multi-modal mobility landscape. For example, in addition to individual cars, densely populated cities also tend to have a more established public transportation system and the population tends to rely more heavily on public transportation. Locations are likely to be closer together and more people are likely to live close to bus stops, subway stations, etc., making such mean of transportation useful and convenient. However, public transportation conventionally runs on fixed schedules and fixed routes and have fixed pick-up/drop-off locations. This means that people have to plan around the factors, including planning their schedules, determining which destinations are convenient, and even where they want to live. For example, some buses only run during certain operating hours and are thus are not available as an option during off hours. The inflexibility of conventional transportation also affects businesses and real estate utilization. For example, businesses located close to subway stations or other public transportation access points may have increased foot traffic or patronage due to the convenience. Similarly, residential buildings that are close to such public transportation access points may also be more desirable at least to some. In effect, the fixed nature of conventional transportation coupled with the population's reliance on it may cause these densely populated cities to become even more clustered around these access points, rather than evenly utilizing space across the city. Commuter trains provide a means for traveling within and between several cities and is prevalent between cities with populations that may live in one city and work in another city or other have populations that frequently travel between the cities. However, like other forms of conventional public transportation, commuter trains typically run according to a set schedule between set stops.

Densely populated cities may also be more conducive for walking, as destinations may often be within a short, walkable, distance. Walking also provides the added benefits of independence, energy conservation, and fitness gains. However, cities and neighborhoods may vary in pedestrian safety and ease. For example, well-lit sidewalks and other paved pedestrian paths may provide a better environment for pedestrians, and thus more people may consider walking as a practical form of travel. Additionally, weather may also influence pedestrians. For example, inclement weather may make walking impossible at times, even for a short distance. Additionally, there may be other circumstances that make walking particularly difficult, such as if a person is carrying large or heavy items or wearing uncomfortable shoes, the destination being further away, among other situations. Thus, although walking may be an available form of mobility in certain types of environments, it may be difficult to rely upon it all of the time. Similar to walking, bicycles provide an alternative that allows people to travel relatively independently while conserving energy and gaining fitness benefits. However, people may not have space to store a bicycle or may not use bicycles frequently enough to warrant owning one. As illustrated in FIG. 1, bike sharing has recently become a popular means of providing shared access to bicycles when needed. For example, a user can rent or borrow a bicycle from a bike station for a particular trip and return the bicycle to another bike station at their destination or to the original bike station upon returning from the trip.

As populations grow and lifestyles become increasingly dynamic, people and places are becoming more connected than ever before. People often need to travel within and between cities for various reasons such as for work, socializing, recreation, among others. Such travels may vary greatly in distance, such as a few blocks, across town, across the country, or even abroad. The frequency and scheduling of the travels may vary greatly as well, such as daily commutes, a scheduled event, and spontaneous trips. Regardless of the distance, destination, or time of travel, people expect to have the freedom to move about and be at their desired location at a desired time. Thus, transportation and mobility systems are fundamental in making such a lifestyle possible. However, conventional means of mobility are legacy systems that may no longer be suitable to meet the needs of present and future cities and their populations. For example, as people become more connected, there may often be influxes of traffic to certain area due to large gatherings, such as for organized events, to spontaneous gatherings quickly galvanized through social media, among other phenomenon that is unique to modern societies. Transportation systems and modalities need to be robust enough to handle the changing demands, redefining and yet working within the constraints of existing infrastructures. However, as population grows, more land is used to build housing, office, and retail space to meet the demands of the increasing population. Thus, additional transportation is needed to support the mobility of the population, yet less space is available for transportation. For example, less space may be available for parking and yet there may be an increase in the number of cars. Such resource constraints mean that transportation and mobility technology must be designed and innovated upon for increased efficiency, providing dynamic services that meet the needs of present and future populations while reducing the resources required to do so.

The present disclosure is directed to technology for bicycle sharing systems as well as other vehicle sharing systems. Existing bicycle sharing systems 108 typically include a station 112 which holds a plurality of bikes 114. A user may interact with a kiosk 116 at the station 112 to rent or borrow one of the available bikes 114 if there are any. For example, the user may swipe a card (e.g., credit card, membership card, identification card) to unlock a bike. Conversely, when a user if finished using a bike, they may return the bike by docking the bike back onto a station. However, the situations may arise in which a user arrives at a bicycle station with the intention of getting a bicycle, only to find that there are no bikes available, throwing a wrench into their plans. Similarly, a user may want to return their bike to a station when they arrive at their destination but find that the station is full and has no docking spots available. Thus, the user may have to find another station, which may be further away and without knowing if there will be docking spots available at that station.

Figure 2:
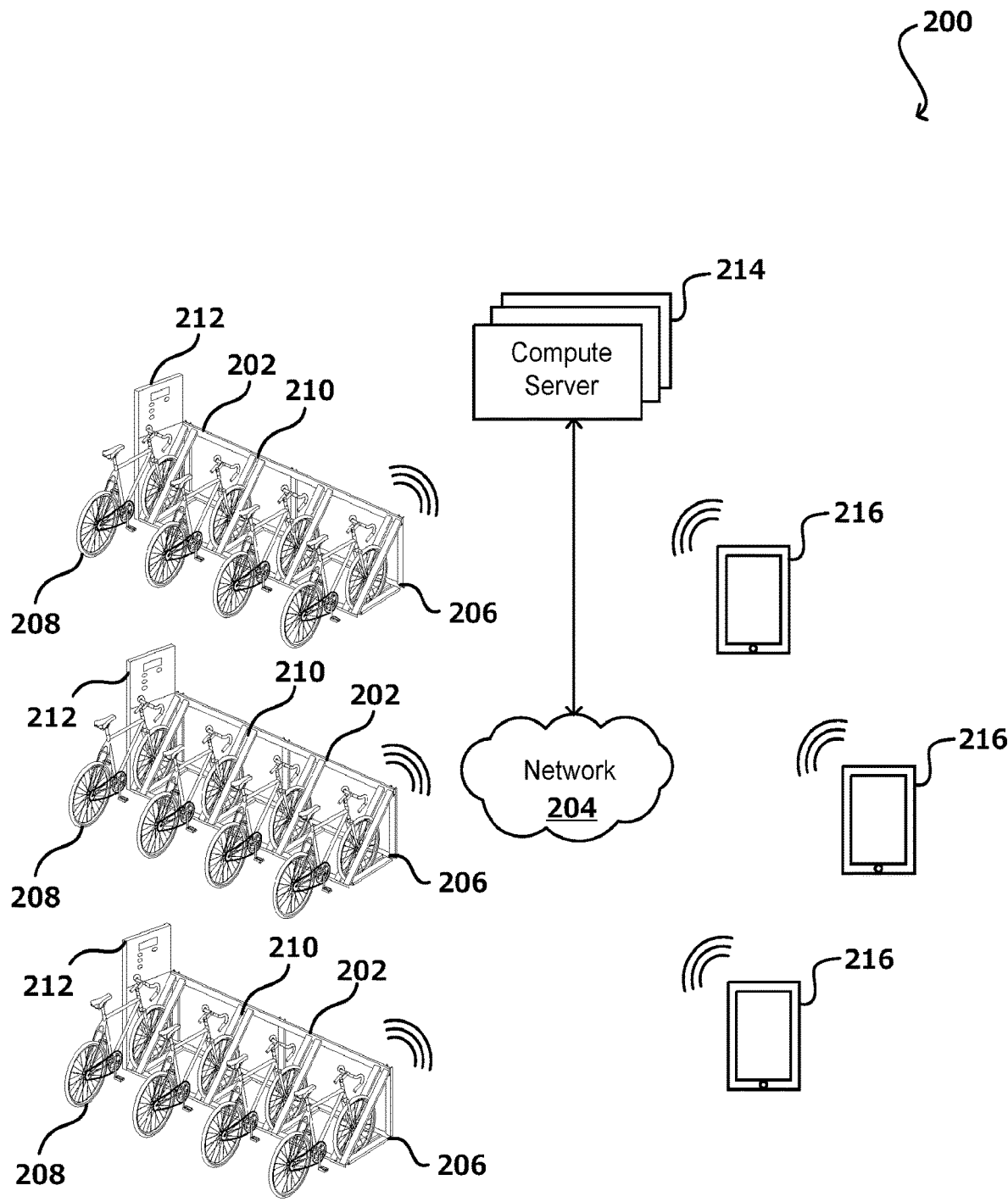
FIG. 2 illustrates an example of a smart bicycle sharing system with station-based intelligence, in accordance with various embodiments of the present disclosure.

FIG. 2 illustrates an example of a smart bicycle sharing system 200 with station-based intelligence, in accordance with various embodiments. An intelligent bicycle sharing system 200 may include a plurality of bike stations 202 located in different geographic locations, such as various parts of a neighborhood, city, or across multiple regions across the country. The bike stations are connected to one or more networks 204, such as the Internet, a cellular network, a local area network (LAN), an Ethernet, Wi-Fi, or a dedicated network, among other such options. The bike stations 202 may collect various data regarding bike utilization and other parameters associated with respective stations. Such data collected from the plurality of bike stations, coupled with respective metadata, may be used by a compute server 214 to determine various utilization statistics, patterns, and other insights that can be used to optimize the intelligent bicycle sharing system 200. User devices 216, such as smart phones, tablet, wearables, personal computer, and the like, may be communicative with individual bike stations 202 and/or the compute server 214 over the one or more networks 204, allowing users to provide input information and receive output information with respect to the bicycle sharing system 200.

In various embodiments, a bike station of the intelligent bicycle sharing system 200 may include a docking portion 206 for holding a plurality of bicycles 208. In some embodiments, the docking station 206 may have a specific number of docking spots 210 and thus can hold a maximum number of bicycles 208. In some other embodiments, the docking station 202 does not have individually defined docking spots. The docking portion may include locking mechanisms for locking the bicycles to the bike station 202. In some embodiments, there is one locking mechanism for each docking spot for locking one bicycle to the bike station. In this example, the locking mechanism may lock conventional bicycles to the bike station, in which the bicycles do not need specific or corresponding hardware. Thus, in this embodiment, the bicycles 208 of the intelligent bike sharing system may be conventional bicycles that do not include special hardware or electronic devices. In some embodiments, the docking portion 206 may not include locking mechanism such that the bicycles can be freely used. Specifically, the bicycles 208 in such embodiments may be removed and returned without needing to be unlocked from the bike station. In such embodiments, the bicycles 208 and/or the bike stations may include various sensor devices to detect when a bicycle is removed from the station, when a bicycle is returned to the station, or general availability of bicycles at a station, among other utilization data.

A bike station 202 may include a kiosk portion 212 for facilitating checking out or checking in of bicycles. In some embodiments, the bike station 202 may include one kiosk that controls the locking and unlocking of all of the docking spots at the bike station. In some other embodiments, each docking spot may include its own kiosk. A kiosk 212 may include an interface, such as a human-machine interface that may include a combination of user interfacing components, such as a display, a keypad, buttons, a touchscreen, audio output, microphone, camera, among others. The kiosk 212 may also include various payment or identity verification devices, such as coin-drops or cash receptacles, magnetic card readers for reading credit cards, debit cards, account cards, or other types of magnetic cards. The kiosk 212 may also include near-field communication (NFC) readers, Bluetooth, among various other wireless communication interfaces and devices. The kiosk 212 may also include one or more biometric identification features such as a fingerprint recognition, facial recognition, and the like.

The kiosk portion 212 may enable a user to checkout a bicycle by performing one or more actions, such as entering account information, swiping, tapping, or holding a card at the card reader, depositing cash, among others. If the information provided by the user, either in the form of entered authentication parameters (e.g., account number, password), credit card, account card, or other device (e.g., phone, smartwatch) is authenticated, a bike 208 may be unlocked from the bike station 202 and the user can use the bike 208. In some embodiments, depositing a required amount of cash may also cause the bike to be unlocked.

In some other embodiments, the bike station 202 may include a wireless communication interface that does not include human interfacing components. Rather, in such embodiments, the bike station 202 may communicate with a user device 216 directly through a wireless communication protocol. For example, the user device 216 may include a mobile device carried by a user. The user device 216 may have a specific software application (i.e., "app") installed thereon for providing a user interface between the user and the bike station 202. The user may perform certain actions on the user device through the app to check out and/or check in a bicycle 208. In some embodiments, the app may be associated with an account for the user and/or be connected to a form of payment such as credit card credentials (e.g., credit card number) or bank account credentials (e.g., account number, routing number), or other third party payment platforms. In some embodiments, authentication and user identification may be performed passively, such as through proximity based sensing. For example, a device may emit a signal and a user carrying such a device may approach a bike station, and when the device is within a signal detection range of the bike station, the bike station may detect the device and receive a signal emitting from the device. The signal may include authentication parameters, thereby causing the user to be authenticated and a bicycle to become unlocked.

In any of the above embodiments, among other embodiments, the intelligent bike sharing system may collect various types of data across the plurality of bike stations 202. For example, each bike station 202 may collect data regarding when a bike is checked in or out, and by whom. In some embodiments, each bike 208 in the intelligent bike sharing system includes a unique identifier such that the bike stations 202 can identify which bike is being checked out or checked in. Thus, the journey of a particular bicycle 208 can be tracked. For example, it can be detected that bike A was checked out at a bike station at a first location and checked in at another bike station at a second location at a later time, and thus it can be inferred that bike A was used for a trip from the first location to the second location. The data collected from the bike stations may include metadata such as a bike station identifier and timestamp, and may include or be associated with a geographic location among other metadata.

The compute server 214 may receive the data and the metadata collected from bike stations via the one or more networks 204. The at least one network 204 can include any appropriate network, including an intranet, the Internet, a cellular network, a local area network (LAN), or any other such network or combination, and communication over the network can be enabled via wired and/or wireless connections. In various embodiments, the compute server 214 may include one or more servers with one or more processors and storage elements for storing and processing the data received from the bike stations 202 and performing various functions utilizing the data, such as authenticating a user based on provided credentials, performing transactions, recording and analyzing bike usage data, tracking a location of a bike, among other computer functions. In various embodiments, one or more data analysis models (e.g, trained machine learning based model) may be stored in the compute server 214 and used to make determinations or predictions based on various data. In some embodiments, the compute server 214 may include a distributed computing system, or "cloud computing" environment, in which computing and storage may be distributed across a network of resources, such as servers and storage, which may be rapidly provisioned as needed.

In various embodiments, a user interface to the intelligent bike sharing system may be provided via the user devices 216, which are connected to the one or more networks 204. The user devices 216 may include devices through which a user can watch, listen to, or read content, and include at least one form of input such as a keyboard, buttons, or touchscreen, and at least one form of output such as a display or speaker. The user devices 216 can include various computing devices such as smart phones, tablet computers, wearable computers (e.g., smart glasses or watches), desktop or notebook computers, and the like. The user devices 216 can include any appropriate electronic device operable to send and receive requests, messages, or other such information over an appropriate network and convey information back to a user of the device. In this example, the user devices 216 can communicate with the server compute environment 214 over the at least one network 204. A user is able to utilize a user device 216 to interact with the intelligent bike sharing system, such as to view updates or data related to various bike stations 202, such as currently available bikes, and the like. The user may also be able to check out a bike or check in a bike through the user device 216, access their account, among other interactions. In some embodiments, a software application ("app") may be installed on the user device 216 specifically to provide a user interface for interacting with the intelligent bike sharing system.

Figure 3:
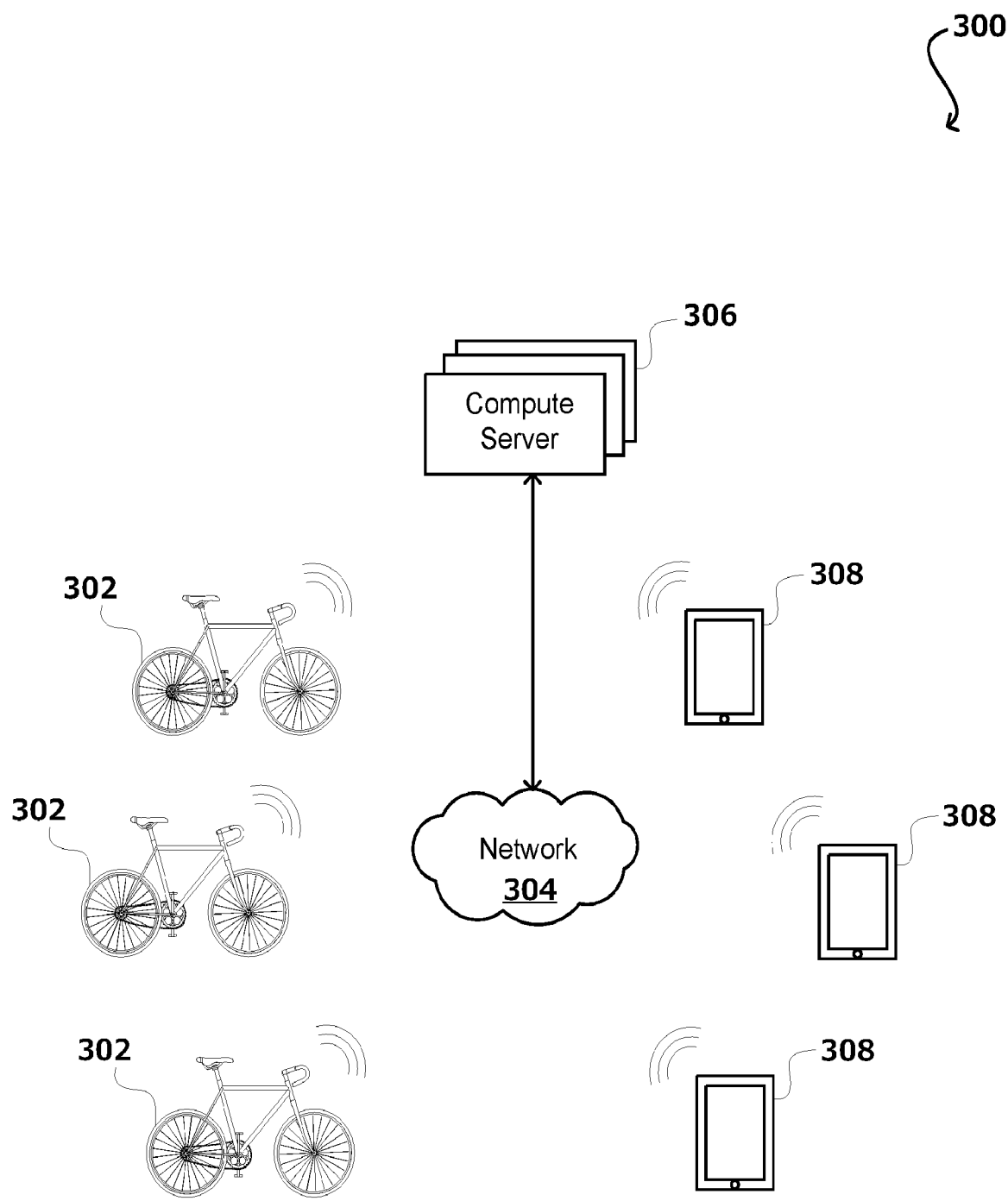
FIG. 3 illustrates an example of a smart bicycle sharing system with bike-based intelligence, in accordance with various embodiments of the present disclosure.

FIG. 3 illustrates an example of a smart bicycle sharing system 300 with bike-based intelligence, in accordance with various embodiments. An intelligent bicycle sharing system 300 may include a plurality of networked bicycles 302. The bicycles are connected to one or more networks 304, such as the Internet, a cellular network, a local area network (LAN), an Ethernet, Wi-Fi, or a dedicated network, among other such options. The bicycles 302 may collect various data regarding bike utilization, geographic location, routes taken, biometric properties of riders, among other information. Such data collected from the plurality of bicycles, coupled with respective metadata, may be used by a compute server 306 to determine bicycle availability. For example, the compute server 306 may track the number of bicycles 302 at a given location and provide feedback or information to a user regarding the availability of bicycles at that location. User devices 308, such as smart phones, tablet, wearables, personal computer, and the like, may be communicative with individual bicycles 302 and/or the compute server 306 over the one or more networks 304, allowing users to provide input information and receive output information with respect to the bicycle sharing system 300.

In various embodiments, the intelligent bicycle sharing system 300 may be dockless, in which the bicycles 302 do not need to be docked at individual docking spots as described above with respect to the bike stations 202 in FIG. 2. Rather, the bicycles 302 may be parked at designated zoned areas, conventional parking spots and bicycle racks, or anywhere a bicycle may be positioned. The bicycles 302 may each include a processor, a network communications interface, and a location tracking device such as a global position system (GPS) unit. These components allow the bicycle to collect data and communicate the data over the one or more networks. For example, the GPS unit tracks the geographic location of the bicycle 302, allowing the current location as well as a travel path of the bicycle 302 to be known.

In some embodiments, a bicycle 302 may include a locking mechanism that locks the bicycle to a structure. For example, a bicycle 302 may be locked to a designated structure. In some other embodiments, the locking mechanism may lock the functions of the bicycle, rendering it unusable without necessarily locking it to a structure. For example, the locking mechanism may lock a wheel of the bicycle, a gear, a chain, or any other component of the bicycle that is needed in order for a user to ride the bicycle. In various embodiments, the locking mechanism of a bicycle may be released upon performing a user authentication process, which may take many forms.

A bicycle 302 may include an interface, such as a human-machine interface that may include a combination of user interfacing components, such as a keypad or touch screen through which a user may enter credentials (e.g., username, password, pin number). In some embodiments, the credentials may be in the form of biometric data such as fingerprint, retina scan, and the like. In some embodiments, the bicycle may include detectors or readers for accepting cards (e.g., credit cards, debit cards, account cards, or other types of membership/identification cards) or other signal-based tokens (e.g., key fob, smart phone, wearable device, RFID devices). The detectors or readers on the bicycle may include near-field communication (NFC) readers, Bluetooth, iBeacon, among various other wireless communication interfaces and devices. The interface on the bicycle enables a user to unlock or otherwise checkout a bicycle by performing one or more actions, such as entering account information, swiping, tapping, or holding a card or at the card reader, presenting a smart phone or other user device, among others. If the user is successfully authenticated, the bicycle may be unlocked and the user can use the bike. In some embodiments, the detector on the bicycle may be a proximity based sensor, which may detect a signal-based token within range and automatically unlock the bicycle when a user carrying such a token is within range. The identity of the user may also be identified through the token. In various embodiments, the bicycle may include various output devices as a part of the human-machine interface, such as as speakers, displays, tactile feedback device, among others, for presenting various information to the user.

In some other embodiments, the bicycles 302 may include a wireless communication interface that does not include human interfacing components. Rather, in certain such embodiments, the bicycles 302 may communicate with a user device through a wireless communication protocol. In other such embodiments, the bicycle may communicate with a computer environment 306 over the one or more networks 304 rather than directly with the user device 308. For example, the user device 308 may include a mobile device carried by a user. The user device 308 may have a specific software application (i.e., "app") installed thereon for providing a user interface between the user and the bicycles. The user may perform certain actions on the user device through the app to check out and/or check in a bicycle. In some embodiments, the app may be associated with an account for the user and/or be connected to a form of payment such as credit card credentials (e.g., credit card number) or bank account credentials (e.g., account number, routing number), or other third party payment platforms. In some embodiments, authentication and user identification may be performed passively, such as through proximity based sensing. For example, a device may emit a signal as the user carrying such a device approaches a bike station, and when the device is within a signal detection range of the bike station, the bike station may detect the device and receive a signal emitting from the device. The signal may include authentication parameters, thereby causing the user to be authenticated and a bicycle to become unlocked. In other embodiments, the user device 308 may submit a request to the compute environment 306, including credentials and location or a specific bicycle the user would like to unlock. The computer environment may authenticate the request and transmit instructions to the bicycle to be unlocked.

As described, the bicycles 302 may include various sensors, processors, and other electronic devices to gather and transmit data. For example, it may be detected when a user checks out or unlocks the bicycles as well as the identity or account associated with the the user, and when the user checks the bicycle back in to be available for use by another user. Additionally, the location of the bicycles during these events, and at any other time, may be known as well. Various other types of data may be detected as well, and can be used to provide various useful insights or perform various tasks.

The compute server 306 may receive the data and the metadata collected from the bicycles via the one or more networks 304. The at least one network 304 can include any appropriate network, including an intranet, the Internet, a cellular network, a local area network (LAN), or any other such network or combination, and communication over the network can be enabled via wired and/or wireless connections. In various embodiments, the compute server 306 may include one or more servers with one or more processors and storage elements for storing and processing the data received from the bike stations and performing various functions utilizing the data, such as authenticating a user based on provided credentials, performing transactions, recording and analyzing bike usage data, tracking a location of a bike, receiving feedback from users, among other computer functions. In various embodiments, one or more data analysis models (e.g., trained machine learning based model) may be stored in the compute server 306 and used to make determinations or predictions based on various data. In some embodiments, the compute environment may include a distributed computing system, or "cloud computing" environment, in which computing and storage may be distributed across a network of resources, such as servers and storage, which may be rapidly provisioned as needed.

In various embodiments, as mentioned, a user interface to the intelligent bike sharing system 300 may be provided via the user devices 308. The user devices 308 may include devices through which a user can watch, listen to, or read content, and include at least one form of input such as a keyboard, buttons, or touchscreen, and at least one form of output such as a display or speaker. The user devices 308 can include various computing devices such as smart phones, tablet computers, wearable computers (e.g., smart glasses or watches), desktop or notebook computers, and the like. The user devices 308 can include any appropriate electronic device operable to send and receive requests, messages, or other such information over an appropriate network and convey information back to a user of the device. In this example, the user devices 308 can communicate with the server compute server 306 over the at least one network 304. A user is able to utilize a user device 308 to interact with the intelligent bike sharing system, such as to view updates or data related to various bike stations, such as currently available bikes, and the like. The user may also be able to check out a bike or check in a bike through the user device, access their account, among other interactions. In some embodiments, a software application ("app") may be installed on the user device specifically to provide a user interface for interacting with the intelligent bike sharing system.

The present disclosure provides an intelligent vehicle sharing system, such as the bicycle sharing systems of FIGS. 2 and 3, able to provide helpful information related to the vehicles, such as user parameters, availability predictions, utilization statistics, and the like. For example, availability of the bicycles may be determined by the system counting the number of bikes checked out or otherwise reserved at a location and subtracting that number from the total bikes at the station. Furthermore, the system may monitor potential maintenance events for the bicycles to temporarily list a bicycle as being unavailable, even if the bicycle is not reserved or otherwise checked out. In some embodiments, a model, such as a machine learning learning model (e.g., neural network) may be trained using the historical data, among other data, as training data such that the model can predict availability. For example, the model may be utilized to predict bicycle maintenance, thereby enabling bicycles to be listed as unavailable prior to maintenance activities. This not only improves the user experience by preventing a user from checking out a book that may not be functioning at acceptable levels, but also enables the operator to efficiently recognize and collect bicycles for maintenance activities.

Figure 4:
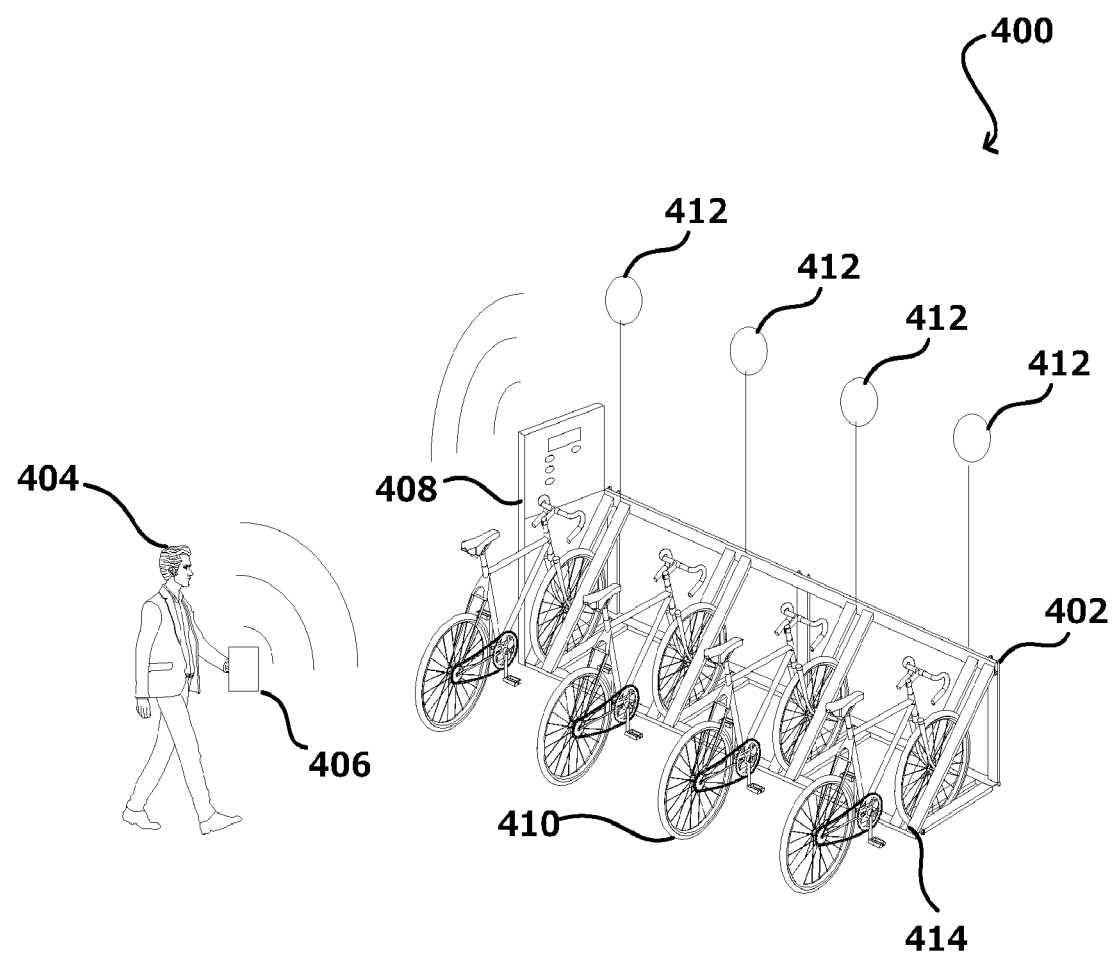
FIG. 4 illustrates an example user interface of a smart bicycle sharing system, in accordance with various embodiments.

FIG. 4 illustrates an example of an environment 400 that includes a bicycle sharing system 402 approached by a potential user 404. The user 404 is carrying a user device 406, such as a tablet, smart phone, wearable device, or the like, as described above. The illustrated user device 406 communicates with a kiosk 408 of the bicycle sharing system 402, in the illustrated embodiment. It should be appreciated that in various embodiments the user device 406 may communicate directly with one or more of the bicycles 410. In various embodiments, the communication between the user device 406 and the kiosk 408 and/or the bicycles 410 is facilitated by one or more near field communication (NFC) protocols, such as Bluetooth or iBeacon, as described above. Accordingly, as the user 404 gets within a range of the bicycle sharing system 402, the bicycle sharing system 402 may detect the user 404 and thereafter provide one or more indications related to the availability of the bicycles 410.

The illustrated bicycle sharing system 402 includes a plurality of indicators 412, each indicator corresponding to a docking location 414 for the bicycles 410. It should be appreciated that in various embodiments the indicators 412 may be mounted directly to the bicycles 410 themselves. The indicators 412 may take various forms, such as auditory indicators, visual indicators, and the like. For example, the indicators 412 may include colored light bulbs that illuminate different colors based on the status of the bicycle 410 associated with the indicators 412. For example, a green light may indicate the bicycle 410 is available, a yellow light may indicate the bicycle 410 is reserved, and a red light 410 may indicate that is no bicycle 410 currently in the docking location 414. It should be appreciated that the above color-coded example is for illustrative purposes only and is not intended to limit the visual indication provided by the indicators 412. For instance, the light may be a solid color that flashes when the bicycle 410 is available and ready for check out. Flashing may draw the user's attention and also provide a beacon as to the location of the bicycle sharing system 402 for users that may be unfamiliar with the region.

In various embodiments, the indicators 412 may be auditory indicators that provide a sound, such as a blip or a chirp, to indicate that the bicycle 410 is ready and available. Moreover, the indicators 412 may provide verbal instructions to the user 404. For example, upon checking out an available bicycle 410, the indicators 412 may verbally instruct the user 404 to get the bicycle 410 closes to the kiosk 408. As such, the user 404 will not have to guess about the availability of the bicycle 410, but has a quick and efficient indication providing information regarding bicycle availability. As will be described in detail below, in various embodiments the indicators 412 may be paired or associated with the user device 406 to provide further indications. Moreover, in embodiments, the user device 406 may be used without the indicators 412.

In various embodiments, the indicators 412 may remain illuminated throughout the day and night to provide potential users of a preemptive indicator regarding bicycle available. For example, even without the user 404 within the detectable range, the indicators 412 may enable users in the vicinity to quickly identify whether a bicycle is available or whether a docking location is available to drop off a bike. For example, a free docking location may be indicated by a particular color, thereby enabling users that have checked out bicycles in different locations to identify potential drop-off spots at a distance. Accordingly, the user experience may be improved because the user will not ride all the way up to the vehicle sharing system 402 only to realize there is no place to deposit their bicycle.

Figure 5:
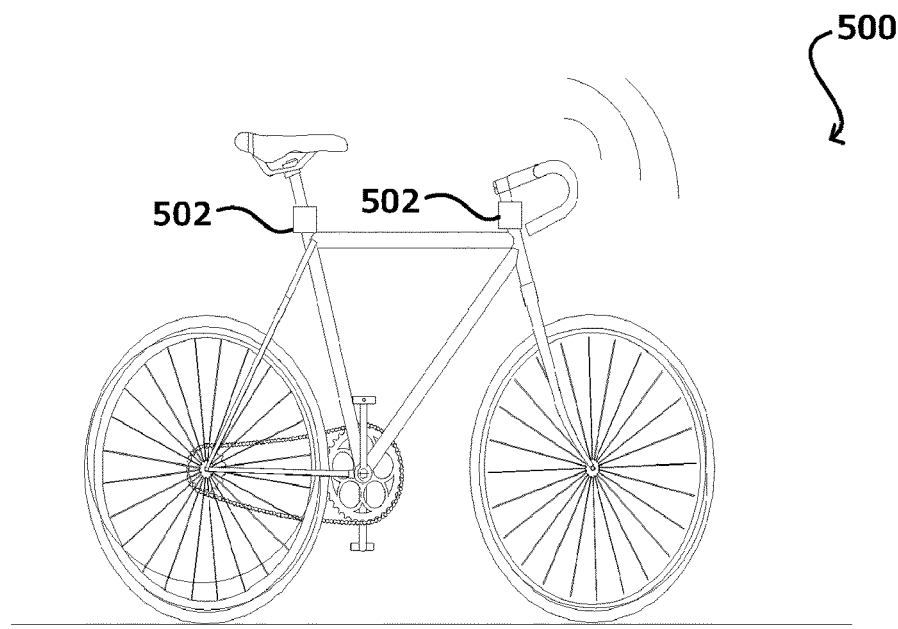
FIG. 5 illustrates an example of a smart bicycle with adjustable components, in accordance with various embodiments.

FIG. 5 illustrates an example smart bicycle 500 having an indicator 502 for providing an alert or information to a user regarding the availability of the bicycle. 500. As described above, the indicator 502 may be in the form of an auditory, visual, or other type of indicator that provides some sort of message or alert to a user indicative of the availability of the bicycle. For example, the indicator 502 may be a light, which may also be used as an alert light to notify other vehicles of the bicycle 500, that is illuminated a certain color based on the availability of the bicycle 500. Furthermore, the indicator 502 may flash or otherwise visually indicate information about the bicycle 500. Additionally, in various embodiments, the indicator 502 may be an auditory indicator, such as a speaker that provides a sound to alert the user as to which bicycle 500 is available. Moreover, it should be appreciated that the indicator 502 may do multiple functions simultaneously or in succession. For instance, the indicator 502 may flash while also emitting a sound. In the illustrated embodiment, the bicycle 500 is equipped with NFC protocol to enable communication with the user device, compute server, or a combination thereof. Accordingly, in embodiments where the bicycle 500 is not secured to a rack and/or there is no kiosk, the bicycle 500 may still be equipped to send and receive communications to/from the user device.

Figure 6:
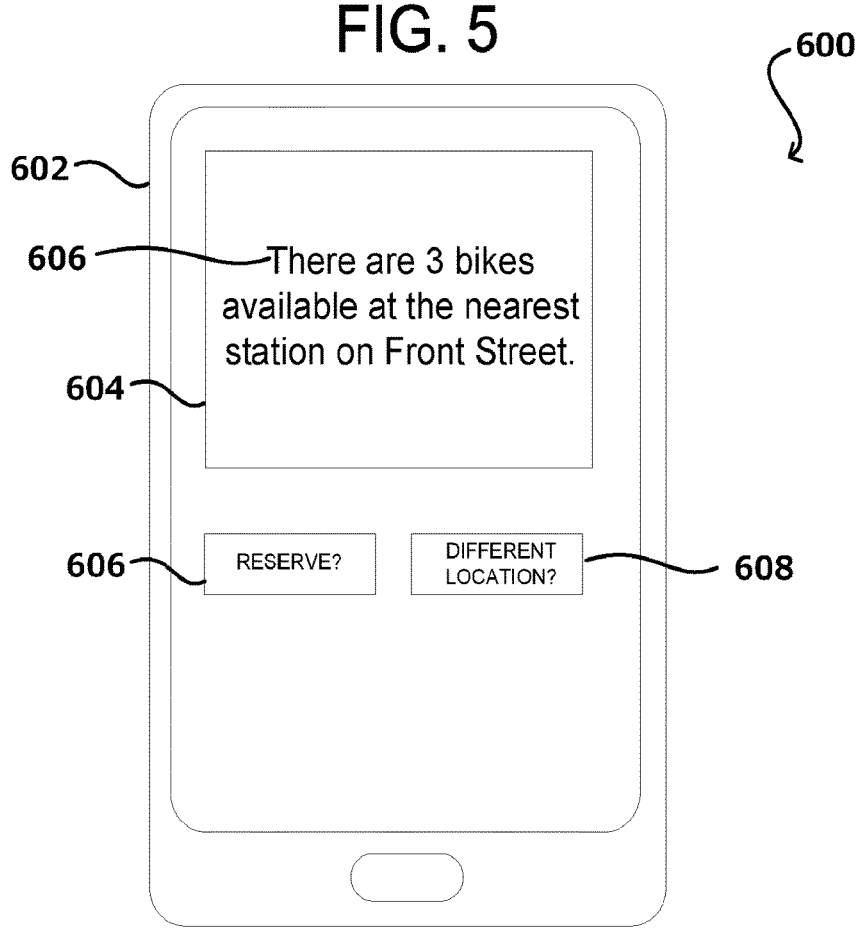
FIG. 6 illustrates a diagram of an example system implementation for providing resource use parameter predictions for a vehicle sharing environment, in accordance with various embodiments.

FIG. 6 illustrates an example user interface 600 on a user device 602 for providing indications to the user regarding bicycle availability. In various embodiments, the user device 602 may communicate with the bicycle sharing system or the bicycle itself, for example via NFC protocols or wireless internet functionality, as described above. The user device 602 may further include a GPS locator that enables the user device 602 to determine a position of the user device 602 relative to one or more bicycle sharing systems. As the user travels in a direction, an application stored on memory on the user device 602 may be running to alert the user as to locations of bicycle sharing systems and also availability of bicycles. For example, in the illustrated embodiment, the user interface 600 includes an alert 604 that provides a message 606 to the user. The message 606 may be auditory, visual, or haptic. For example, the message 606 may include text, a sound, and also a vibration. Accordingly, the user may be notified of bicycle availability prior to arrival at the bicycle sharing system.

In various embodiments, the alert 604 is presented when the user is within a detection distance of the bicycle sharing system. The detection distance may vary. For example, the application may include settings that allow the user to select different detection distances and/or authorize different electronic methods of communication. In various embodiments, the user may limit the detection distance to a particular number of feed or within the range of the NFC protocol. That is, the user may particularly select the detection distance based on personal preferences. As a result, the user may be notified regarding bike availability at a variety of distances.

In the illustrated embodiment, the user interface 600 further includes feedback prompts 606, 608, which may be touch-activated prompts that enable the user to interact with the user interface 600. In various embodiments, the feedback prompts 606, 608 may ask the user whether they want to reserve a bicycle, ask the user if they want to check a different area, or the like. Accordingly, the user interface 600 may allow the user to interact with the bike sharing system or individual bicycles to enhance the user's experience by providing a heads up notification regarding availability and further providing an indication as to which bike is available for use.

Figure 7:
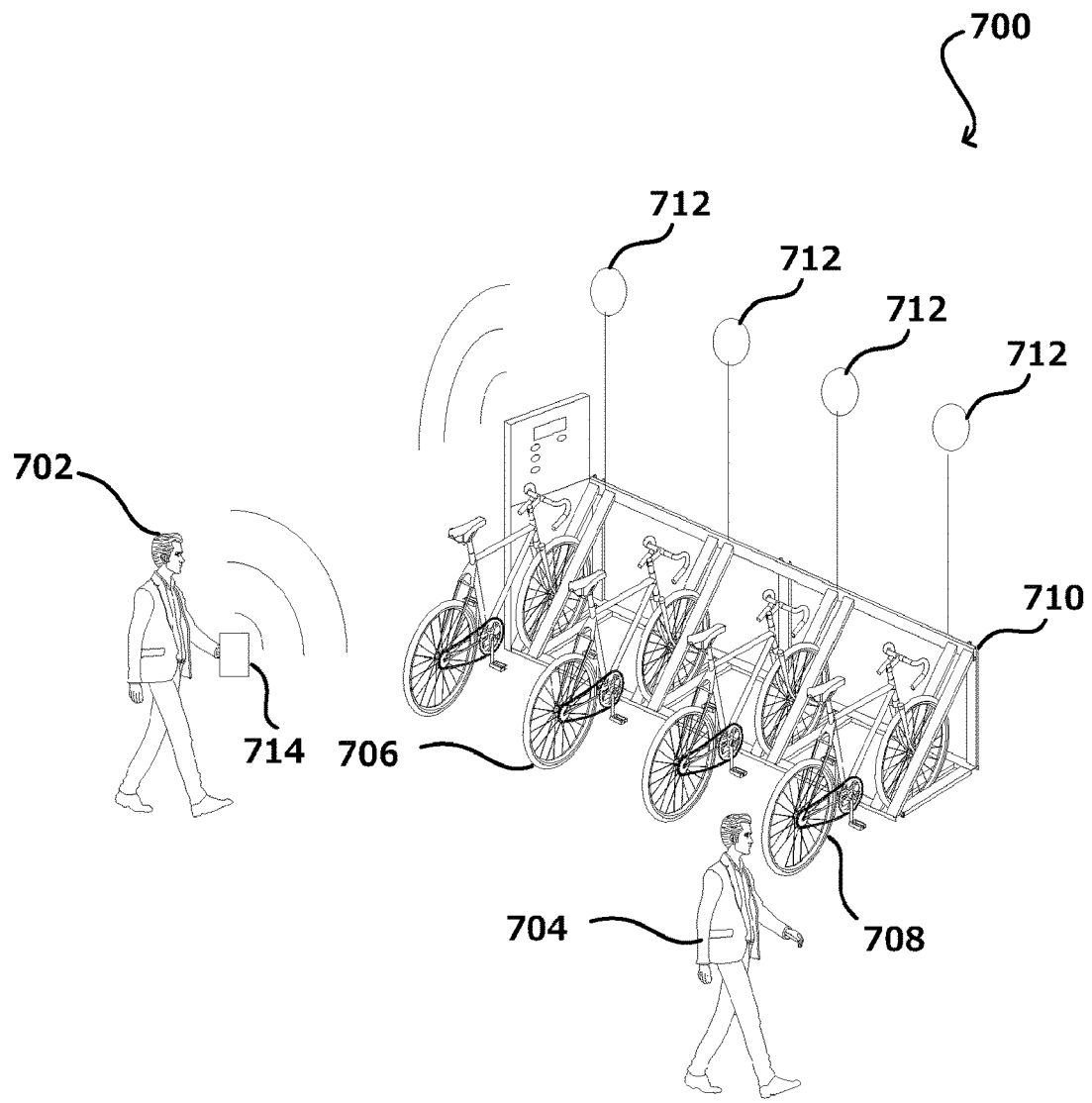
FIG. 7 illustrates an example process for predicting use parameters of a resource in a vehicle-sharing environment, in accordance with various embodiments of the present disclosure.

FIG. 7 illustrates an example bike sharing station 700 where two users 702, 704 are checking out bicycles 706, 708. In the illustrated embodiment, the second user 704 is positioned at a rack 710, which holds the bicycle 708 in position. Further, an indicator 712 is associated with the bicycle 708 in its position, which may include an auditory, visual, or other type of indicator to notify the second user 704 which bicycle 708 to select. As the second user 704 is preparing to select the bicycle 708, the first user 702 approaches the bike sharing station 700 and an associated user device 714 communicates with the bike sharing station 700. In various embodiments, the communication may automatically check out a bicycle for the first user 702. Further, in embodiments, the communication may transmit information to the first user 702, for example, the availability and location of a bicycle that the user may check out. In the illustrated embodiment, the indicator 712 associated with the bicycle 706 may be illuminated or otherwise provide notice to the first user 702 to select the bicycle 706. As illustrated, there is a one-bike buffer between the bicycle 706 and the bicycle 708. In various embodiments, the bike sharing station 700 may deliberately select bicycles that are not right next to one another, when possible, in order to provide additional room to the users to remove the bike from the rack 710. Advantageously, the users 702, 704 may not get in one another's ways, and additionally, may feel more secure by not being placed directly next to another user.

In various embodiments, the bike sharing station 700 and/or the individual bicycles may monitor the location of other bicycles relative to one another. That is, the bike sharing station 700 may track a distance between available bikes of the bike sharing station 700. Thereafter, as a new user approaches to check out a bike, the bike sharing station 700 may select an available bike that is not directly beside another bike being checked in or checked out by the user. In certain embodiments, monitoring the relative positions of the bikes may enable the bike sharing station 700 to recommend a bike as far away from other users as possible, thereby providing increased room for the user to check out the bike, position their gear, or otherwise prepare to use the bike. Similarly, the bike sharing station 700 may also recommend locations to dock bikes being checked in based on the position of other bikes or other users associated with those bikes. In this manner, potential interaction, such as bumping bikes into each other, may be reduced.

Figure 8:
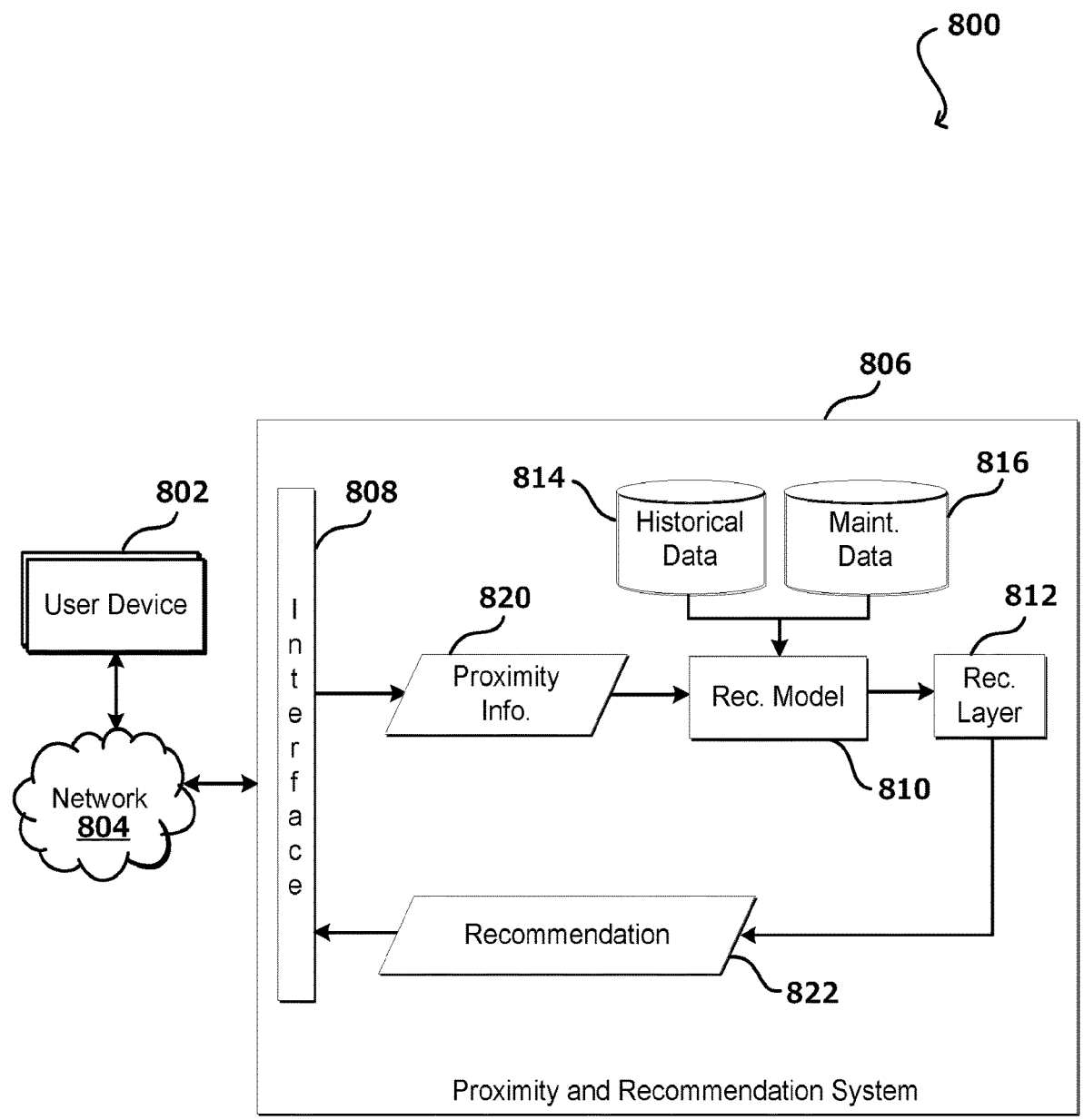
FIG. 8 illustrates an example process for predicting and updating use parameters of a resource in a vehicle-sharing environment, in accordance with various embodiments of the present disclosure.

FIG. 8 illustrates a diagram 800 of an example system implementation for identifying users and recommending vehicles for a vehicle sharing environment, in accordance with various embodiments. Resource may refer to vehicles, docking spots, or any other such resources that may have an available state and an unavailable state. In various embodiments, a user device 802 may be used by a user to request and obtain a resource for use and receive associated notifications for that resource. Additionally, in various embodiments, the user device 802 may be used to alert or otherwise notify the vehicle sharing environment that the user is within proximity of the vehicle sharing environment. In an example, the user device is able to send and receive information, such as requests, calls, and data, across one or more networks 804 to a proximity and recommendation system 806. This may include transmitting data, such as authentication data to enable access to the vehicles of the vehicle sharing environment. Moreover, the user device 802 may receive information, such as a notification representative of the vehicle the user should select. In some embodiments, the user device 802 may include any type of computing devices having network connectivity, including smart phones, tablets, smart watches, smart glasses, other wearables, personal computers, notebook computers, and the like. The one or more networks 804 can include any appropriate network, such as the Internet, a local area network (LAN), a cellular network, an Ethernet, Wi-Fi, Bluetooth, radiofrequency, or other such wired and/or wireless network. In some embodiments, a plurality of user devices 802 may access the resource use parameter prediction system through different types of networks. The r proximity and recommendation system 806 can include any appropriate resources for performing the various functions described herein, and may include various servers, data stores, and other such components known or used for providing content from across a network (or from the "cloud").

In various embodiments, the proximity and recommendation system 806 may include an interface 808, a recommendation mode 18, and a recommendation layer 812. The system 806 may also include a historical data database 814, and a maintenance database 816. Such modules and databases may be implemented jointly, separately, or in any combination on one or more devices, including physical devices, virtual devices, or both. Information may be passed between any of the modules and databases through the physical and/or virtual devices on which the modules and databases are implemented.

The interface layer 808 of the proximity and recommendation system 806 may include a networking interface that can facilitate communication between the user device and the proximity and recommendation system 806. Requests received by the proximity and recommendation system 806 can be received through the interface layer 808. Example requests may include a request to check out a resource or be informed of the availability of resources when the user is within certain proximity of the system. The interface layer 808 may also provide outputs from the proximity and recommendation system 806 to the user device 802, such as recommended vehicles to select from a plurality of vehicles. The interface may also facilitate communication between the proximity and recommendation system and individual vehicles or vehicle stations. For example data (e.g., utilization data) collected by individual vehicles or vehicle stations may be transmitted to the proximity and recommendation system where it is received through the interface. In the illustrated example, a request is sent from the user device over the one or more networks and received at the interface. In some embodiments, the request includes a proximity or relative location of the user. The proximity is input into the recommendation model to determine availability of the resources and provide a recommendation for resources to select for the queried conditions. In various embodiments, the model 810 may be trained on historical data stored in the historical data database 814.

The recommendation model 810 may receive the proximity information 820 and determine a recommendation 822. The prediction model 810 may include various types of models including machine learning models such as a neural network trained on the historical data. Other types of machine learning models may be used, such as decision tree models, associated rule models, neural networks including deep neural networks, inductive learning models, support vector machines, clustering models, regression models, Bayesian networks, genetic models, various other supervise or unsupervised machine learning techniques, among others. The prediction model 810 may include various other types of models, including various deterministic, nondeterministic, and probabilistic models. For example, the prediction model 810 includes one or more neural networks trained to determine a proximity and recommendation for the user based on availability, proximity to other users, potential upcoming maintenance events, and the like. As mentioned, the model may be trained on historical data 814 which may include, for example, a record of resources currently checked out or reserved for check out. Additionally, the historical data may also include maintenance data 816, such as tire pressure, tread depth, time since last tune up, and the like. The maintenance data 816 may be acquired from various sensors distributed on the vehicle or near the vehicle. For example, in embodiments where the vehicle is a bicycle, the tires may be equipped with a pressure monitoring system that relays information back to the system 806. Further, an image may be captured of the bicycle having full tire pressure and a distance between a fixed location, such as a central rotational axis of a wheel, and a ground plane may be obtained. Subsequent images may be taken of the bicycle at various times to determine whether the fixed location is lower than when the tire pressure was full. If the distance changes by a threshold amount, it may be indicative of low tire pressure. Additionally, the tread depth may be monitored, for example utilizing a camera and identification software. Furthermore, in various embodiments, maintenance records may also be utilized. For example, a duration of time between tune ups, seat replacements, gear greasing, and the like may be continuously monitored and fed into the recommendation model 810. Over time, the recommendation model 810 may utilize this information to provide better recommendations to users. For example, bicycles with low tire pressure, while available for check out, may not be recommended to users due to the likelihood of a poor user experience. Moreover, bicycles nearing their tune ups may not be recommended to thereby ensure that the bicycle will be available for pick up and subsequent tuning. As such factors may influence recommendations, the recommendation model 810 may take into account this maintenance data as well. In some embodiments, the historical data 814 and maintenance data 816 may make up training data used to train the model. In certain such embodiments, the training data may include a large number of example input-output pairs. For example, a particular input-output pair may include as an input of an availability of a bike, upcoming reservations, and maintenance information. The output may include a recommendation to use the bike or to not use the bike. Given a large enough number of such example input-output pairs, the model may be trained to estimate an output based on a certain input. Specifically, the model may estimate a recommendation 822 given proximity 820.

The neural network may be a regression model or a classification model. In the case of a regression model, the output of the neural network is a value on a continuous range of values representing the recommendation. In the case of a classification model, the output of the neural network is a classification into one or more discrete classes. For example, the output representing the recommendation may be classified as "bad", "good", or "great" with respect to availability and likely maintenance issues. The prediction model may output the recommendation, which may be transmitted to the user device via the interface. In some embodiments, the recommendation may be presented in various forms, such as an indication on the vehicle, an indication on the user device, an indication proximate the vehicle, or the like.

In some embodiments, the recommendation from the model 810 is used in the recommendation layer 812, which generates the recommendation 822 for the user. For example, if the recommendation for the proximity 820 has a history of further adjustments, such as vehicles too close to maintenance activities, the recommendation 822 may include a range of recommendations (e.g., a number of different vehicles to select) to provide options to the user to determine the most suitable vehicle. The recommendation 822 may be transmitted to the user device 802 via the interface 808 and the one or more networks 804.

Figure 9:
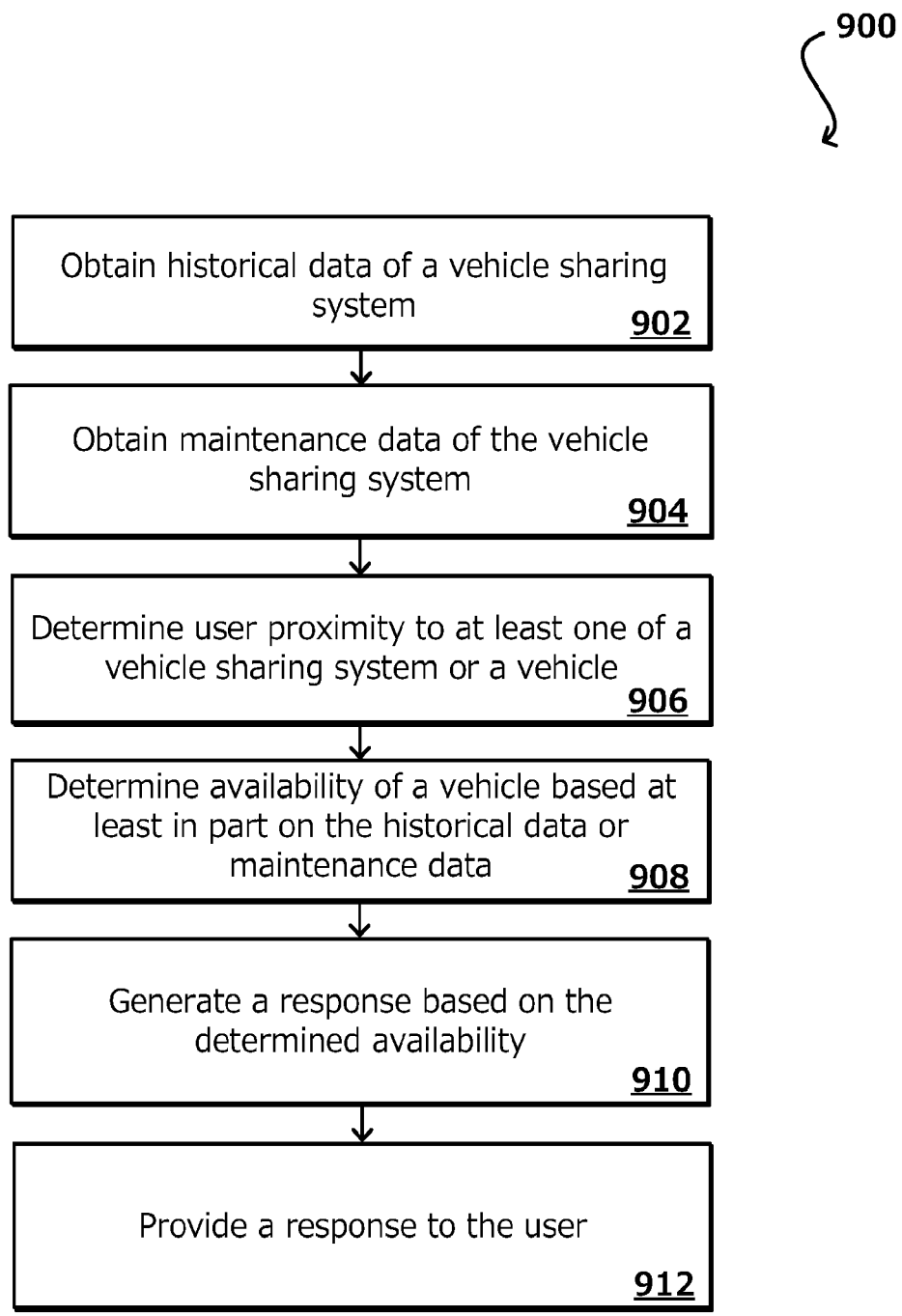
FIG. 9 illustrates a set of basic components of one or more devices of the present disclosure, in accordance with various embodiments of the present disclosure.

FIG. 9 illustrates an example process 900 for providing recommendations for vehicle use based on proximity, in accordance with various embodiments. It should be understood that, for any process discussed herein, there can be additional, fewer, or alternative steps performed in similar or alternative orders, or in parallel, within the scope of the various embodiments. In this example, historical data of a vehicle sharing system is obtained 902. In various embodiments, the historical data corresponds to tracking a number of bicycles available for check out at the vehicle sharing station. For example, if the vehicle sharing stations begins a day with 5 bicycles and 2 are checked out and 1 is reserved, the historical data may subtract these bicycles to indicate that 2 remain available for check out. Further, in various embodiments, maintenance data of the vehicle sharing system is obtained 904. The maintenance data may correspond to current maintenance activities, such as bicycles that have been removed for tune ups or the like, or for impending future maintenance activities, such as bicycles having a detected low tire pressure. Impending or current maintenance activities may be utilized to remove bicycles from the pool of available bicycles, even when they have not been checked out or reserved. Removing these bicycles from the pool may improve the customer experience because it may reduce the likelihood the user checks out a bicycle with low tire pressure, which may become flat during the ride and frustrate the user.

The process may further determine user proximity 906 to the vehicle sharing station. For example, NFC protocol may be associated with a user device of the user and the vehicle staring station and/or vehicles of the vehicle sharing station. When the user is within a range, which may be predetermined by the user or by the capabilities of the NFC protocol, the vehicle sharing station or vehicle may receive a signal corresponding to the user device and the associated user. For example, the user device may include a digital application that corresponds to a user account associated with the vehicle sharing station. Upon receipt of the signal regarding the range of the user, the user account may be accessed to determine whether the signal corresponds to an active user account. Further, the vehicle sharing system and/or the vehicle may determine availability for the user 908. Such availability may be determined by evaluating the number of vehicles present and further determining whether any of the present vehicles may be otherwise unavailable, for example, due to being reserved or preparing for maintenance.

A response is generated based on the determined availability 910. For example, the response may indicate that a vehicle is available or that a vehicle is not available. This response may further be transmitted to the user 912. In various embodiments, the vehicle sharing station or the vehicle includes an indicator which may be utilized to provide information to the user. The indicator may transmit a visual, auditory, haptic, or other type of alert to the user. For example, as described above, the indicator may be a light that illuminates a certain color or flashes. Further, the indicator may be a sound or chime. Additionally, the indicator may combine various methods, such as being associated with an application on the user's user device that vibrates, makes a sound, and delivers a message. In this manner, the user may be notified as to the availability of the vehicle when the user is within certain proximity of the vehicle.

Figure 10:
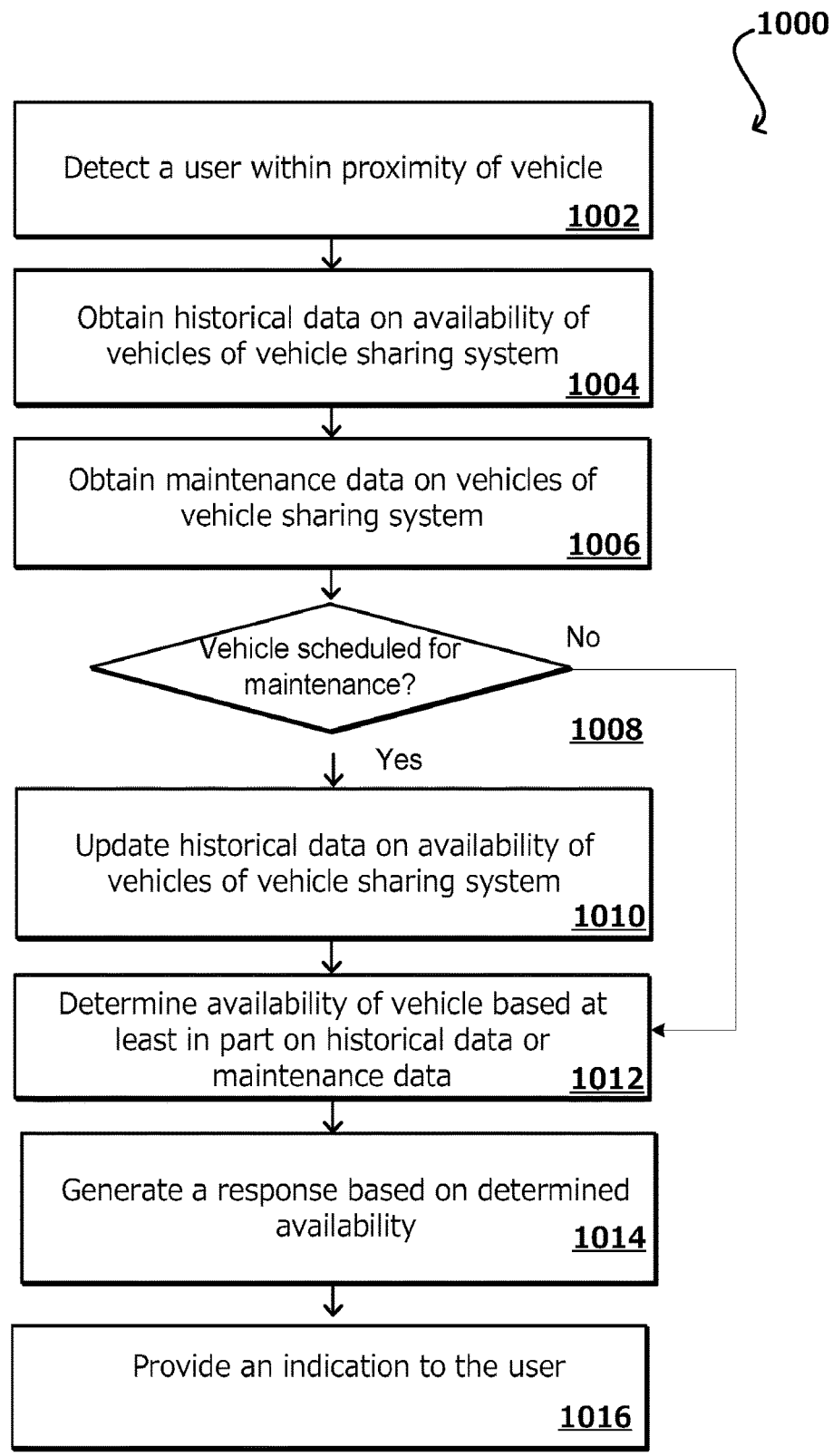
FIG. 10 illustrates an example process for detecting a user within proximity of a vehicle and predicting vehicle availability in a vehicle-sharing environment, in accordance with various embodiments of the present disclosure.

FIG. 10 illustrates an example process 1000 for detecting user proximity and predicting vehicle availability, in accordance with various embodiments. In this example, a user is detected within proximity of a vehicle 1002. For example, a vehicle sharing station that is storing or otherwise associated with the vehicle may detect the user. Additionally, in embodiments, the vehicle itself may detect the user. Detection may be accomplished with NFC protocol, which receives a signal from a user device associated with the user when the user is within a given range. Furthermore, in various embodiments, object detection may be utilized to recognize a user within proximity of the vehicle. For example, a camera may be positioned proximate the vehicle that evaluates passing objects. When a passing object is identified as a human, the human's proximity to the vehicle may be determined. Furthermore, in various embodiments, movement of the object may be detected to reduce the likelihood of false positives. For example, a user moving away from the vehicle may be ignored while a user moving toward the vehicle may be identified as a potential user of the vehicle.

In various embodiments, the process includes obtaining historical data regarding the availability of one or more vehicles 1002. For example, the vehicle sharing station may keep a tally of the number of vehicles present at the station. The vehicle sharing station may determine a number of vehicles at the station and subtract each vehicle that is checked out. Furthermore, vehicles that are reserved may also be considered as checked out and unavailable. The process may also include obtaining maintenance data for one or more vehicles 1004. For example, the maintenance data may refer to upcoming preventative maintenance, upcoming tune ups, or predicted future problems, such as predicting future low tire pressure or tread wear. The process may determine whether the vehicle is scheduled for maintenance 1008. If so, the historical data may be updated 1010 to indicate the vehicle scheduled for maintenance is unavailable. Subsequently, the process determines vehicle availability 1012. The historical data, maintenance data, or a combination thereof may be utilized to determine the vehicle availability.

The process may further generate a response based on the determined availability 1014. The response may be that vehicles are available or that vehicles are not available. This response may then be provided to the user in the form of an indication 1016. The indication may be auditory, visual, haptic, or a combination thereof. For example, an auditory response may be a notification to the user that vehicles are available. Example visual indications may be lights that are illuminated different colors correlated to availability (e.g., green for available, yellow for reserved, red for unavailable). Additionally, a light may flash to indicate which vehicles are available. Moreover, in various embodiments, the indication may be transmitted to the user device. For example, an application on the user device may receive a notification that is accompanied by a vibration, sound, and/or message. Accordingly, the user may be notified about the availability of vehicles before the user reaches the vehicle sharing station. As a result, the user's experience may be improved because the user will know to avoid the station if vehicles are unavailable and try a different location.

Figure 11:
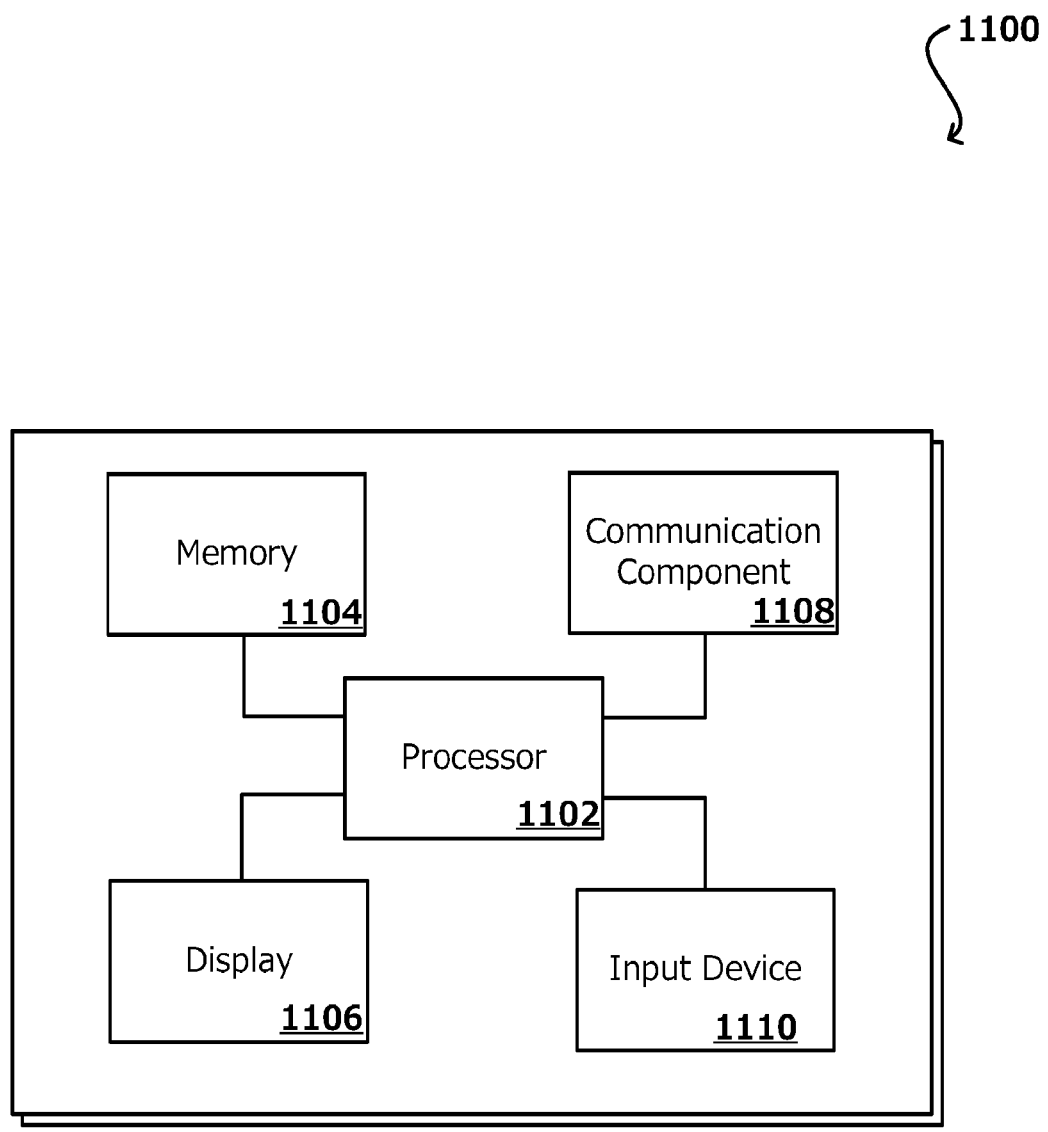
FIG. 11 illustrates a set of basic components of one or more devices of the present disclosure, in accordance with various embodiments of the present disclosure.

FIG. 11 illustrates a set of basic components of one or more devices 1100 of the present disclosure, such as the user devices, bike station, and bicycles. In this example, the device includes at least one processor 1102 for executing instructions that can be stored in a memory device or element 1104. As would be apparent to one of ordinary skill in the art, the device can include many types of memory, data storage or computer-readable media, such as a first data storage for program instructions for execution by the at least one processor 1102, the same or separate storage can be used for images or data, a removable memory can be available for sharing information with other devices, and any number of communication approaches can be available for sharing with other devices. The device typically will include at least one type of display element 1106, such as a touch screen, electronic ink (e-ink), organic light emitting diode (OLED) or liquid crystal display (LCD), although the devices may output information via other means, such as through audio speakers. The device can include at least one communication component 1108 that may enable wired and/or wireless communication of voice and/or data signals, for example, over a network such as the Internet, a cellular network, a Wi-Fi network, BLUETOOTH®, and the like. The device can include at least one additional input device 1110 able to receive conventional input from a user. This conventional input can include, for example, a push button, touch pad, touch screen, camera, microphone, keypad, scanner, detector, or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   determine a user proximity to a vehicle sharing system, the vehicle sharing system comprising a plurality of resources, and the user proximity corresponding to a user distance from the vehicle sharing system;
   obtain historical data collected from the vehicle sharing system, the historical data including a total number of resources available during a time period;
   train a machine learning-based model using the historical data;
   determine an availability of a resource of the plurality of resources based at least in part on the historical data and the machine learning-based model;
   generate an availability response indicative of the availability of the resource; and
   provide the availability response to an indicator, the indicator alerting the user as to the availability of the resource.

2. The system of claim 1, wherein the instructions when executed further cause the system to:
   obtain maintenance data collected from the vehicle sharing system, the maintenance data including at least one of past maintenance activity, present maintenance activity, or future maintenance activity for the plurality of resources;
   train the machine learning-based model using the maintenance data; and
   update the availability based at least in part on the maintenance data and the machine learning-based model.

3. The system of claim 1, wherein the vehicle sharing system includes a docked bicycle sharing system comprising a plurality of docking stations and a plurality of bicycles, and wherein the user proximity is determined by receiving a signal from a user device of a user over a near field communication (NFC) protocol.

4. The system of claim 1, wherein the user proximity is determined by:
   obtaining an image from an area proximate the vehicle sharing station;
   processing the image using one or more object detection algorithms to identify a human; and
   upon detection of the human, determining the user distance from the vehicle sharing station.

5. A computer-implemented method, comprising:
   determining a user proximity to a vehicle sharing system, the vehicle sharing system comprising a plurality of resources, and the user proximity comprising at least a distance of a user from the vehicle sharing system;
   obtaining historical data collected from the vehicle sharing system, the historical data including a quantity of resources physically located at the vehicle sharing system;
   training a machine learning-based model using the historical data;
   determining an availability for a resource of the plurality of resources based at least in part on the historical data and the machine learning-based model; and
   providing an indication to the user of the availability, the indication notifying the user of the availability from a notification distance, the notification distance being greater than a visual distance where the user could visually identify the availability.

6. The method of claim 5, the method further comprising:
   obtaining maintenance data collected from the vehicle sharing system, the maintenance data comprising information regarding future maintenance activity, past maintenance activity, or present maintenance activity for the plurality of resources; and
   training the machine learning-based model using the maintenance data, wherein the availability is updated based at least in part on the maintenance data and the machine learning-based model.

7. The method of claim 5, where determining the user proximity further comprises receiving a signal, by the vehicle sharing system, from a user device of the user, the signal being transmitted via a near field communication (NFC) protocol.

8. The method of claim 5, wherein the plurality of resources includes a plurality of vehicle docking spots, an individual vehicle docking spot associated with one of the resources, the method further comprising:
   recommending a resource of the plurality of resources to the user based on the availability and a recommendation model trained, via a neural network, using a number of input-output pairs; and
   making the recommendation of the resource of the plurality of resources based at least in part on a proximity of the resource to another resource of the plurality of resources, wherein the resources is selected such that the resource has the greatest distance between the resource and the other resources of the plurality of resources.

9. The method of claim 5, wherein determining the user proximity further comprises:
   obtaining an image from an area proximate the vehicle sharing station;
   processing the image using one or more object detection algorithms to identify a human; and
   upon detection of the human, determining the distance of the user from the vehicle sharing station.

10. The method of claim 5, wherein the indication comprises an auditory indication, a visual indication, a haptic indication, or a combination thereof.

11. The method of claim 5, wherein the plurality of resources includes a plurality of vehicle docking spots, an individual vehicle docking spot associated with one of the resources, and the indication is mounted to at least one of the vehicle docking spots or the vehicle.

12. The method of claim 5, wherein the indication is transmitted to a user device associated with the user.

13. The method of claim 5, further comprising:
obtaining maintenance data collected from the vehicle sharing system, the maintenance data comprising a plurality of images of the plurality of resources and information regarding future maintenance activity, past maintenance activity, and present maintenance activity for the plurality of resources;
training the machine learning-based model using at least the maintenance data; and
predicting future maintenance activities using the machine learning-based model.

14. The method of claim 5, further comprising:
authorizing a resource for check out to the user; and
updating the historical data based at least in part on the resource being checked out by the user.

\* \* \* \* \*